United States Patent [19]
Yoshida et al.

[11] Patent Number: 4,581,394
[45] Date of Patent: Apr. 8, 1986

[54] AGENT FOR FORMING SURFACE-PROTECTING LAYER ON COATED PAPER

[75] Inventors: Eiichi Yoshida; Tetsuhiko Yamaguchi; Susumu Tago; Kunio Imamura, all of Kawasaki, Japan

[73] Assignee: Showa Denko Kabushiki Kaisha, Tokyo, Japan

[21] Appl. No.: 668,780

[22] Filed: Nov. 6, 1984

[30] Foreign Application Priority Data

Nov. 7, 1983 [JP] Japan ............................. 58-208758
Nov. 7, 1983 [JP] Japan ............................. 58-208759
Nov. 28, 1983 [JP] Japan ............................. 58-222204

[51] Int. Cl.$^4$ ............................................. C08L 51/00
[52] U.S. Cl. .................................... 523/407; 524/503; 524/557; 525/59; 428/511
[58] Field of Search ............... 523/407; 524/503, 557; 525/58, 59, 61

[56] References Cited

U.S. PATENT DOCUMENTS 2,861,051 11/1958 Caldwell ............................. 525/59
3,094,500  6/1963 Herman ............................... 525/59
3,677,990  7/1972 Barabas .............................. 525/59
3,772,407 11/1973 Williams ............................. 525/59

Primary Examiner—Paul R. Michl
Attorney, Agent, or Firm—Sughrue, Mion, Zinn, Macpeak and Seas

[57] ABSTRACT

An agent for forming a surface-protecting layer on a coated paper, which comprises an aqueous solution of an alkali metal salt, ammonium salt or amine salt of a graft copolymer and an epoxy group-containing crosslinking agent incorporated in the aqueous solution, said graft copolymer comprising (A) 10 to 60% by weight of a polyvinyl alcohol polymer selected from the group consisting of partially saponified polyvinyl alcohols, polyvinyl alcohols containing copolymerized units of a vinyl monomer having carboxyl group, and polyvinyl alcohol having the recurring vinyl alcohol units esterified with a higher fatty acid, (B) 20 to 70% by weight of acrylamide or methacrylamide, (C) 5 to 30% by weight of at least one member selected from the group consisting of acrylonitrile, methacrylonitrile, lower alkyl esters of acrylic acid and methacrylic acid and hydroxyl lower alkyl esters of acrylic acid and methacrylic acid, and (D) 5 to 20% by weight of at least one vinyl monomer containing a carboxyl group.

11 Claims, No Drawings

AGENT FOR FORMING SURFACE-PROTECTING LAYER ON COATED PAPER

BACKGROUND OF THE INVENTION

1. Field of the Invention

The present invention relates to an agent for forming a surface-protecting layer on a coated paper. More particularly, the present invention relates to an agent for forming a surface-protecting layer on a coated paper, which comprises an aqueous solution of an alkali metal salt, ammonium salt or amine salt of a graft copolymer and an epoxy group-containing crosslinking agent incorporated in the aqueous solution.

2. Description of the Prior Art

With recent development of information instruments and labor-saving instruments, various information recording papers have been proposed and put into practical use. Among these recording papers, heat-sensitive recording papers are especially widely used in outputs of computers, printers of desk-type electronic calculators, recorders of various measuring devices, facsimiles, copying machines, automatic ticket vending machines and the like. The properties required for these recording papers have recently become severer. For example, in case of a heat-sensitive recording papers, not only heat-sensitive characteristics such as the antisticking property and the coloring property but also the oil-resistant and water-resistant preservability, that is, the property that disappearance or bleeding of the colored portion is not caused by oil, water or a chemical such as a plasticizer, are required. More specifically, a heat-sensitive recording paper is prepared by dispersing a lueco dye type colorant such as Crystal Violet, a color developer such as bisphenol A and a filler such as a wax into water, adding a binder composed of an organic polymeric substance to the dispersion to form a heat-sensitive coating liquid and coating this liquid on the surface of a starting high-quality paper to form a heat-sensitive layer, and coloration is caused in the heat-sensitive layer by a thermal head of a printer or the like. Accordingly, when a recording paper is used in the field where the colored portion of the recording paper falls in contact with a plasticizer or oil, the plasticizer or oil reacts with the colored colorant to cause disappearance of the formed color, as is well-known in the art. Moreover, it is pointed out that when a recording paper is used in the field where the recording paper falls in contact with water or an aqueous liquid, water permeates into the heat-sensitive layer to dissolve the binder into water, resulting in peeling of the colored portion.

As means for improving the oil-resistant and water-resistant preservability for overcoming the foregoing difficulties of heat-sensitive recording papers, there has been tried a method in which the amounts used of the binder and wax are increased at the step of forming the coating liquid within such a range that the coloring property is not degraded, and a heat-sensitive layer is formed by using this coating liquid. However, the improvement of the oil-resistant and water-resistant preservability according to this method is still insufficient and no practically satisfactory result can be obtained.

Further, the use of polyvinyl alcohol or carboxy-group-modified polyvinyl alcohols for a thermosensitive recording adhesive label is proposed in U.S. Pat. No. 4,370,370, and the use of a copolymer of acrylamide or methacrylamide with arcrylonitrile, methacryloni-tril, or a lower alkyl or hydroxyl lower alkyl ester of acrylic or methacrylic acid as an agent for forming a surface-protecting layer on a coated paper is proposed in Japanese Unexamined Patent Publication (Kokai) Nos. 57-167489 and 57-171795. However, even by these measures, the improvement of the oil-resistant and water-resistant preservability is still insufficient.

SUMMARY OF THE INVENTION

We made researches with a view to developing an agent for forming a surface-protecting layer excellent in the function of imparting an oil-resistant and water-resistant preservability to a coated paper, especially a heat-sensitive recording paper having a heat-sensitive recording layer containing a leuco dye type colorant. As the result, it was found that when a coating liquid comprising an effective component formed by incorporating a crosslinking agent having an epoxy group into an aqueous solution of an alkali metal salt, ammonium salt or amine salt of a gaft copolymer of a certain polyvinyl alcohol polymer as a backbone polymer with acrylamide or methacrylamide, acrylonitrile or methacrylonitrile, an acrylic acid ester and a vinyl monomer having a carboxyl group is coated on the surface of a coated paper, the intended object can be attained without degrading the inherent properties of the coated paper. We have now completed the present invention based on this finding.

More specifically, in accordance with the present invention, there is provided an agent for forming a surface-protecting layer on a coated paper, which comprises an aqueous solution of an alkali metal salt, ammonium salt or amine salt of a graft copolymer and an epoxy group-containing crosslinking agent incorporated in the aqueous solution, said graft copolymer comprising (A) 10 to 60% by weight of a polyvinyl alcohol polymer selected from the group consisting of partially saponified polyvinyl alcohols, polyvinyl alcohols containing copolymerized units of a vinyl monomer having carboxyl group, and polyvinyl alcohols having the recurring vinyl alcohol units esterified with a higher fatty acid, (B) 20 to 70% by weight of acrylamide or methacrylamide, (C) 5 to 30% by weight of at least one member selected from the group consisting of acrylonitrile, methacrylonitrile, lower alkyl esters of acrylic acid and methacrylic acid and hydroxyl lower alkyl esters of acrylic acid and methacrylic acid, and (D) 5 to 20% by weight of at least one vinyl monomer containing carboxyl group.

DESCRIPTION OF THE PREFERRED EMBODIMENTS

The present invention will now be described below in detail with reference to the preferred embodiments.

The base polymer in the agent for forming a surface protecting layer on a coated paper according to the present invention is a water-soluble alkali metal salt, ammonium salt or amine salt of a copolymer comprising (A) 10 to 60% by weight of a polyvinyl alcohol polymer selected from the group consisting of partially saponified polyvinyl alcohols, polyvinyl alcohol containing copolymerized units of a vinyl monomer having carboxyl group, and polyvinyl alcohols having the recurring vinyl alcohol units esterified with a higher fatty acid, (B) 20 to 70% by weight of acrylamide or methacrylamide, (C) 5 to 30% by weight of acrylonitrile, methacrylonitrile, an alkyl ester of acrylic acid or methacrylic acid having 1 to 4 carbon atoms in the alkyl group or a hydroxyalkyl ester of acrylic acid or methacrylic acid having 1 to 4 carbon atoms in the alkyl group, and (D) 5 to 20% by weight of at least one member selected from a vinyl monomer having one carboxyl group such as acrylic acid or methacrylic acid and a vinyl monomer having two carboxyl groups such as itaconic acid, fumaric acid or maleic acid.

We considered that in order for the agent for forming a protecting layer on a coated paper to exert the intended function without degrading the inherent properties of the coated paper, especially a heat-sensitive recording paper, such as a good antisticking property, a good antifogging property and a high coloring sensitivity, the base polymer of the protecting layer-forming agent should have such properties as a high adhesion to the heat-sensitive layer, an oil or plasticizer impermeability, such a water solubility that the base polymer is not unnecessarily easily soluble in water, a water insolubility after coating and drying on the converted paper and a high softening temperature. Based on this consideration, we designed the molecule of the base polymer. More specifically, the polyvinyl alcohol polymer is used as the backbone polymer so that the wettability of the coating aqueous solution to the coated paper is increased, the effect of the resulting uniform coating layer as the surface-protecting layer is enhanced and the adhesion to the coated layer is improved. Furthermore, by using at least one member selected from acrylamide and methacrylamide as the main monomer to be grafted to the above backbone polymer, the water solubility is imparted, and other copolymerizable monomer which is similar to the main monomer in the structure and physical properties, is water-soluble but becomes hydrophobic when polymerized and has a cyano group, a lower alkyl group or a hydroxyl lower alkyl group is copolymerized with said main monomer to introduce a cyano group, a lower alkyl group or a hydroxyl lower alkyl group into the side chain of the polymer, whereby the water resistance is improved, permeation of an oil or plasticizer is prevented and reduction of the softening temperature is prevented to enhance the capacities of the surface-protecting layer. Moreover, by graft copolymerizing a vinyl monomer having a carboxyl group on the polymer and neutralizing this group with caustic alkali, ammonia or amine to introduce an alkali metal salt, ammonium salt or amine salt of the carboxylic acid into the copolymer, the weight ratio of the monomer (B) in the copolymer can be increased and the water resistance and oil resistance can be improved. Furthermore, by using a crosslinking agent having an epoxy group for this copolymer, a three-dimensional network structure is formed by reaction of the epoxy group of the crosslinking agent with the alkali metal, ammonium or amine salt of the carboxylic acid, whereby permeation of an oil, plasticizer or water can be prevented and the capacities of the surface-protecting layer-forming agent can be further enhanced.

The weight ratios of the backbone polymer and monomers in the graft copolymer will now be described. In order to form a uniform coating layer, improve the effect of the surface-protecting layer and increase the adhesion to the coated layer, it is preferred that the weight ratio of the backbone polymer (A) be increased. However, if the weight ratio of the component (A) is excessively increased, the water resistance is reduced and the sticking property is manifested. In order to improve the oil resistance and water resistance, it is preferred that the weight ratio of the monomer (C) be increased, and in order to increase the sites for reaction with the crosslinking agent, it is preferred that the weight ratio of the monomer (D) be increased. If the weight ratio of the monomer (C) is extremely increased, the water solubility of the copolymer is reduced and an aqueous solution of the copolymer cannot be obtained, and crosslinking is caused in the copolymer to increase the viscosity and cause gelation. On the other hand, if the weight ratio of the component (D) is excessively increased, the hydrophilic property becomes too strong and the water resistance is reduced, and an intended copolymer cannot be obtained.

The preparation of the copolymer of the present invention is not particularly critical. For example, the copolymer of the present invention is preferably prepared according to the following method. Of course, the copolymer may be prepared according to other methods.

An aqueous solution containing the components (B), (C) and (D) at a total monomer concentration of 30 to 65% by weight is quatitatively added to an aqueous solution containing the component (A) at a polyvinyl alcohol polymer concentration of 5 to 35% by weight, which is boiled or maintained at a predetermined temperature and in which a peroxide has been preliminarily incorporated as a polymerization initiator, over a period of 2 to 4 hours to effect reaction, and aging is then conducted for 2 to 4 hours to complete reaction. It is preferred that the concentrations of the aqueous solution of the monomers and the aqueous solution of the component (A) containing the polymerization initiator be selected so that the concentration of the graft copolymer obtained by reaction is 20 to 40% by weight.

Partially saponified polyvinyl alcohols usable for the component (A) are polyvinyl alcohols having unsaponified vinyl acetate units retained in the molecule. The type of the partially saponified polyvinyl alcohols is not particularly critical, but a partially saponified polyvinyl alcohol having a saponification degree of 75 to 96% and a polymerization degree of 500 to 2500 is preferred. The partially saponified polyvinyl alcohols may be partially modified with an acid.

Alternatively, the component (A) may be selected from polyvinyl alcohols containing copolymerized units of a vinyl monomer having carboxyl group, for example, a vinyl monomer having one carboxyl group such as acrylic acid or methacrylic acid or a vinyl monomer having two carboxyl groups such as itaconic acid, fumaric acid or maleic acid. Preferably, such polyvinyl alcohol may contain 2 to 5 mol % of the vinyl monomer units having carboxyl group and have a saponification degree of 75 to 99% and a polymerization degree of 500 to 2500.

The component (A) may also be selected from polyvinyl alcohols having the recurring vinyl alcohol units esterified with a higher fatty acid, preferably a fatty acid having 8 to 18 carbon atoms. This type of polyvinyl alcohols may be prepared by copolymerizing vinyl acetate with vinyl alcohol esterified with a higher fatty acid and then saponifying the obtained copolymer. The examples of the higher fatty acid include Versatic acid, lauric acid and tridecylic acid. Preferably, such polyvinyl alcohol has an esterification degree of 0.5 to 5%, and further be acid modified so as to have an acid modification degree of 1 to 5%.

The type of the peroxide used as the polymerization initiator is not particularly critical, but it is ordinarily preferable to use a water-soluble peroxide such as hydrogen peroxide, t-butyl hydroperoxide, ammonium persulfate or potassium persulfate. The amount used of the polymerization initiator is not particularly critical, but it is ordinarily preferred that the polymerization initiator be used in an amount of 0.1 to 2.0% by weight based on the monomers. The polymerization temperature is not particularly critical, but in order to increase the reaction speed and obtain a homogeneous composition of the monomers in the copolymer, it is preferred that the polymerization be carried out at a higher temperature, especially at the boiling point of the reaction mixture. If the polymerization is carried out at the boiling point, cooling becomes unnecessary. In order for the surface-protecting layer of the polymer formed on the coated paper by coating and drying the coating liquid of the base polymer to have sufficient strength, oil resistance and water resistance, it is preferred that the molecular weight of the polymer be high. However, if the molecular weight of the polymer is too high, the viscosity of the coating liquid is increased and the operation adaptability is reduced. In order to obtain a coating liquid providing a coating layer having relatively high strength, oil resistance and water resistance and having a good operation adaptability, it is preferred that the viscosity of the polymer solution as a 10% aqueous solution at normal temperature be about 50 to about 500 cp. In order to prepare an aqueous solution of the graft copolymer having this viscosity, it is necessary that the amount used of the polymerization initiator should be within the above-mentioned range. The ratio of the aqueous solution of the monomers to water at the time of charging is controlled within the above-mentioned range, so that the viscosity of the aqueous solution of the copolymer obtained by the polymerization is controlled at an appropriate level, the polymerization speed is increased and the polymerization is completed within an appropriate time. The crosslinking agent having an epoxy group should have such properties that the crosslinking agent is water-soluble, the crosslinking agent is stable for a long time when it is mixed with the aqueous solution of the copolymer and present in the aqueous solution but when the coating liquid is coated on a coated paper and dried to form a surface-protecting layer, crosslinking reaction is advanced even at normal temperature and crosslinking reaction is completed in a short time at a high temperature.

In view of the foregoing properties, the epoxy group-containing crosslinking agent is selected from nonionic water-soluble polyepoxy compounds such as polyethylene glycol diglycidyl ether, glycerol diglycidyl ether and trimethylolpropane polyglycidyl ether, and water-soluble epoxy compounds such as a water-soluble copolymer of a glycidyl ester of acrylic acid or methacrylic acid with acrylamide or the like and an epichlorohydrin adduct of polyamide-polyamine. Of cource, crosslinking agents that can be used in the present invention are not limited to these compounds. When the copolymer is mixed with the crosslinking agent, reaction is caused between them and the viscosity is increased, and therefore, the viscosity of the coating liquid formed by mixing them is maintained at a preferable level only for a certain limited time. Accordingly, it is preferred that the coating liquid be coated on a coated paper within this pot life. The weight ratio of the graft copolymer to the crosslinking agent is preferably adjusted to from 10/2 to 10/7 in view of the balance between the pot life of the coating liquid and the properties of the surface-protecting layer formed on the coated paper. In this case, the pot life is generally 18 to 100 hours.

Other polymeric compound, a pigment and a filler such as a wax may be appropriately added to the aqueous solution of the copolymer of the present invention at the step of preparing the coating liquid for forming a surface-protecting layer.

As the coated paper to which the surface-protecting layer-forming agent of the present invention is applied, there can be mentioned a heat-sensitive recording paper, a photographic copying paper and other various information recording papers, and especially excellent practical effects are attained when the present invention is applied to a heat-sensitive recording paper comprising a leuco type dye.

The method for coating the coating solution of the surface-protecting layer-forming agent of the present invention on a coated paper is not particularly critical. For example, the coating liquid is ordinarily coated on the surface of a coated paper by a wire bar or a roll coater so that the thickness of the surface-protecting layer is about 1 to about 5 μm after drying, and drying is effected under conditions suitable for the converted paper to be coated, for example, at 60° to 75° C. for 30 seconds to 5 minutes in case of heat-sensitive recording paper.

The agent for forming a surface-protecting layer on a coated paper according to the present invention will now be described in detail with reference to the following typical examples that by no means limit the scope of the invention.

EXAMPLE 1

(a) Preparation of Surface-Protecting Layer-Forming Agent

A reaction vessel equipped with a stirrer and reflux cooler was charged with an aqueous solution of 30 parts of partially saponified polyvinyl alcohol having a saponification degree of 88% and a polymerization degree of 1500 in 160 parts of water, and the temperature was elevated to the boiling point with stirring. Then, 0.72 part of a peroxide was added to the solution and the solution was refluxed. A monomer solution containing 66 parts of acrylamide, 12 parts of ethyl acrylate and 12 parts of acrylic acid in 120 parts of water was added dropwise to the above solution at such a speed that the total amount of the monomer solution was added in 4 hours, to effect reaction. Then, the mixture was aged for 4 hours to complete reaction. At this point, the concentration of the formed copolymer was 30% by weight. The obtained solution was diluted to form an aqueous solution where the concentration of the copolymer was 10% by weight. The solution was neutralized with concentrated aqueous ammonia so that the pH value was adjusted to 6.8. Then, 14 parts of glycerol diglycidyl ether was dissolved in the solution to form a surface-protecting layer-forming agent. The viscosity of this aqueous solution was 200 cp as measured at a temperature of 20° C., and the pot life was 30 hours.

(b) Preparation of Coating Liquid and Coating on Coated Paper (1) To 100 parts of the surface-protecting layer-forming agent was added 20 parts of calcium carbonate to form a coating liquid. The coating liquid was coated on a heat-sensitive recording paper comprising a leuco dye by using a wire bar and was then dried to form a surface-protecting layer having a thickness of 2 μm on the heat-sensitive recording paper.

(2) The surface-protecting layer-forming agent was spray-coated on a color-photographic paper and dried to form a surface-protecting layer having a thickness of 1 μm on the color-photographic paper.

(c) Oil Resistance and Water Resistance Tests (1) The heat-sensitive recording paper obtained in (b)-1) above was aged at normal temperature for 7 days and was then printed by a thermal head. When the surface was coated with cottonseed oil or dioctyl phthalate and the density of the printed letter was measured after passage of 24 hours, it was found that the density was not changed at all. When the same heat-sensitive recording paper was immersed in water for 24 hours and the surface was rubbed with the fingers, the printed letters was not erased at all.

(2) The photographic paper obtained in (b)-2) above was aged at normal temperature for 7 days and was then used for copying. When the surface was coated with cottonseed oil or dioctyl phthalate and the color tone was examined after passage of 24 hours, no change of the color tone was observed. When the same photographic paper was immersed in water for 24 hours and the surface was rubbed with the fingers, no change was caused on the surface of the photographic paper.

For comparison, the leuco dye type heat-sensitive paper and the color-photographic paper were similarly tested without coating with the surface-protecting layer-forming agent of the present invention. Excellent oil resistance and water resistance as described above were not obtained.

EXAMPLES 2 THROUGH 6

With respect to each of various surface-protecting layer-forming agents described below, in the same manner as described in Example 1, a coating liquid was prepared and coated and dried on a leuco dye type heat-sensitive recording paper and a color-photographic paper, and the oil resistance and water resistance tests were carried out. It was found that each surface-protecting layer-forming agent had properties similar to those of the agent of Example 1.

(2) An aqueous solution formed by dissolving 2 parts of a diglycidyl ether of polyethylene glycol (having a molecular weight of 400) in 100 parts of a 10% by weight aqueous solution of a trimethylamine salt of a graft copolymer comprising 50 parts of partially saponified polyvinyl alcohol having a saponification degree of 94% and a polymerization degree of 500, 35 parts of acrylamide, 5 parts of acrylonitrile and 10 parts of acrylic acid (the viscosity was 140 cp as measured at 20° C. and the pot life was 24 hours).

(3) An aqueous solution formed by incorporating 10 parts of a 30% by weight aqueous solution of a polyamide-polyamine/epichlorohydrin resin (Kaimen 667 supplied by Dick-Hercules Co.) into 100 parts of a 10% by weight aqueous solution of an ammonium salt of a graft copolymer comprising 50 parts of partially saponified polyvinyl alcohol having a saponification degree of 88% and a polymerization degree of 1000, 25 parts of acrylamide, 10 parts of 2-hydroxypropyl methacrylate, 5 parts of methyl methacrylate and 10 parts of methacrylic acid (the viscosity was 200 cp as measured at 20° C. and the pot life was 18 hours).

(4) An aqueous solution formed by incorporating 25 parts of a 10% by weight aqueous solution of a copolymer comprising 80 parts of acrylamide and 20 parts of glycidyl methacrylate into 100 parts of a 10% aqueous solution of a sodium salt of a graft copolymer comprising 40 parts of partially saponified polyvinyl alcohol having a saponification degree of 80%, an acid modification degree of 2.5% and a polymerization degree of 1500, 40 parts of methacrylamide, 15 parts of hydroxyethyl methacrylate and 5 parts of acrylic acid (the viscosity was 250 cp as measured at 20° C. and the pot life was 48 hours).

(5) An aqueous solution formed by incorporating 7 parts of a 30% by weight aqueous solution of a polyamide-polyamine/epichlorohydrin resin (Kaimen 667 supplied by Dick Hercules Co.) into 100 parts of a 10% by weight aqueous solution of an ammonium salt of a graft copolymer comprising 25 parts of partially saponified polyvinyl alcohol having a saponification degree of 88% and a polymerization degree of 1000, 55 parts of acrylamide, 5 parts of acrylonitrile, 10 parts of 2-hydroxypropyl methacrylate and 5 parts of itaconic acid (the viscosity was 180 cp as measured at 20° C. and the pot life was 25 hours).

(6) An aqueous solution formed by incorporating 10 parts of a 30% by weight aqueous solution of a polyamide-polyamine/epichlorohydron resin (Kaimen 667 supplied by Dick Hercules Co.) into 100 parts of a 10% by weight aqueous solution of an ammonium salt of a graft copolymer comprising 50 parts of partially saponified polyvinyl alcohol having a saponification degree of 84% and a polymerization degree of 800, 35 parts of acrylamide, 5 parts of methyl methacrylate and 10 parts of acrylic acid (the viscosity was 170 cp as measured at 20° C. and the pot life was 20 hours).

EXAMPLE 7

(a) Preparation of Surface-Protecting Layer-Forming Agent

A reaction vessel equipped with a stirrer and a reflux cooler was charged with an aqueous solution of 30 parts of polyvinyl alcohol containing 2.5 mol % of copolymerized units of methacrylic acid and having a saponification degree of 99% and a polymerization degree of 1500 in 160 parts of water, and the temperature was elevated to the boiling point with stirring. Then, 0.72 part of a peroxide was added to the solution and the solution was refluxed. A monomer solution containing 66 parts of acrylamide, 12 parts of ethyl acrylate and 12 parts of acrylic acid in 120 parts of water was added dropwise to the above solution at such a speed that the total amount of the monomer solution was added in 4 hours, to effect reaction. Then, the mixture was aged for 4 hours to complete reaction. At this point, the concentration of the formed copolymer was 30% by weight. The obtained solution was diluted to form an aqueous solution where the concentration of the copolymer was 10% by weight. The solution was neutralized with concentrated aqueous ammonia so that the pH value was adjusted to 6.8. Then, 14 parts of glycerol diglycidyl ether was dissolved in the solution to form a surface-protecting layer-forming agent. The viscosity of this aqueous solution was 200 cp as measured at a temperature of 20° C., and the pot life was 30 hours.

(b) Preparation of Coating Liquid and Coating on Coated Paper (1) To 100 parts of the surface-protecting layer-forming agent was 20 parts of calcium carbonate to form a coating liquid. The coating liquid was coated on a heat-sensitive recording paper comprising a leuco dye by using a wire bar and was then dried to form a surface-protecting layer having a thickness of 2 μm on the heat-sensitive recording paper.

(2) The surface-protecting layer-forming agent was spray-coated on a color-photographic paper and dried to form a surface-protecting layer having a thickness of 1 μm on the color-photographic paper.

(c) Oil Resistance and Water Resistance Tests (1) the heat-sensitive recording paper obtained in (b)-1) above was aged at normal temperature for 7 days and was then printed by a thermal head. When the surface was coated with cottonseed oil or dioctyl phthalate and the density of the printed letter was measured after passage of 24 hours, it was found that the density was not changed at all. When the same heat-sensitive recording paper was immersed in water for 24 hours and the surface was rubbed with the fingers, the printed letters was not erased at all.

(2) The photographic paper obtained in (b)-2) above was aged at normal temperature for 7 days and was then used for copying. When the surface was coated with cottonseed oil or dioctyl phthalate and the color tone was examined after passage of 24 hours, no change of the color tone was observed. When the same photographic paper was immersed in water for 24 hours and the surface was rubbed with the fingers, no change was caused on the surface of the photographic paper.

For comparison, the leuco dye type heat-sensitive paper and the color-photographic paper were similarly tested without coating with the surface-protecting layer-forming agent of the present invention. Excellent oil resistance and water resistance as described above were not obtained.

EXAMPLES 8 THROUGH 12

With respect to each of various surface-protecting layer-forming agents described below, in the same manner as described in Example 7, a coating liquid was prepared and coated and dried on a leuco dye type heat-sensitive recording paper and a color-photographic paper, and the oil resistance and wate resistance tests were carried out. It was found that each surface-protecting layer-forming agent had properties similar to those of the agent of Example 7.

(8) An aqueous solution formed by dissolving 2 parts of a diglycidyl ether of polyethylene glycol (having a molecular weight of 400) in 100 parts of a 10% by weight aqueous solution of a trimethylamine salt of a graft copolymer comprising 50 parts of polyvinyl alcohol containing 3 mol % of copolymerized units of acrylic acid and having a saponification degree of 88% and a polymerization degree of 500, 35 parts of acrylamide, 5 parts of acrylonitrile and 10 parts of acrylic acid (the viscosity was 140 cp as measured at 20° C. and the pot life was 24 hours).

(9) An aqueous solution formed by incorporating 10 parts of a 30% by weight aqueous solution of a polyamide-polyamine/epichlorohydrin resin (Kaimen 667 supplied by Dick-Hercules Co.) into 100 parts of a 10% by weight aqueous solution of an ammonium salt of a graft copolymer comprising 50 parts of polyvinyl alcohol containing 2.5 mol % of copolymerized units of methacrylic acid and having a saponification degree of 94% and a polymerization degree of 1000, 25 parts of acrylamide, 10 parts of 2-hydroxypropyl methacrylate, 5 parts of methyl methacrylate and 10 parts of methacrylic acid (the viscosity was 200 cp as measured at 20° C. and the pot life was 18 hours).

(10) An aqueous solution formed by incorporating 25 parts of a 10% by weight aqueous solution of a copolymer comprising 80 parts of acrylamide and 20 parts of glycidyl methacrylate into 100 parts of a 10% aqueous of a sodium salt of a graft copolymer comprising 40 parts of polyvinyl alcohol containing 3.5 mol % of copolymerized units of acrylic acid and having a saponification degree of 80% and a polymerization degree of 1500, 40 parts of methacrylamide, 15 parts of hydroxyethyl methacrylate and 5 parts of acrylic acid (the viscosity was 250 cp as measured at 20° C. and the pot life was 48 hours).

(11) An aqueous solution formed by incorporating 7 parts of a 30% by weight aqueous solution of a polyamide-polyamine/epichlorohydrin resin (Kaimen 667 supplied by Dick Hercules Co.) into 100 parts of a 10% by weight aqueous solution of an ammonium salt of a graft copolymer comprising 25 parts of polyvinyl alcohol containing 2 mol % of copolymerized maleic acid units and having a saponification degree of 88% and a polymerization degree of 1000, 55 parts of acrylamide, 5 parts of acrylonitrile, 10 parts of 2-hydroxypropyl methacrylate and 5 parts of itaconic acid (the viscosity was 180 cp as measured at 20° C. and the pot life was 25 hours).

(12) An aqueous solution formed by incorporating 10 parts of a 30% by weight aqueous solution of a polyamide-polyamine/epichlorohydron resin (Kaimen 667 supplied by Dick Hercules Co.) into 100 parts of a 10% by weight aqueous solution of an ammonium salt of a graft copolymer comprising 50 parts of polyvinyl alcohol containing 4 mol % of copolymerized methacrylic acid units and having a saponification degree of 84% and a polymerization degree of 800, 35 parts of acrylamide, 5 parts of methyl methacrylate and 10 parts of acrylic acid (the viscosity was 170 cp as measured at 20° C. and the pot life was 20 hours).

EXAMPLE 13

(a) Preparation of Surface-Protecting Layer-Forming Agent

A reaction vessel equipped with a stirrer and a reflux cooler was charged with an aqueous solution of 30 parts of polyvinyl alcohol having 2 mol % of the recurring vinyl alcohol units esterified with Versatic acid, containing 2.5 mol % of copolymerized maleic acid units and having a polymerization degree of 1500 in 160 parts of water, and the temperature was elevated to the boiling point with stirring. Then, 0.72 part of a peroxide was added to the solution and the solution was refluxed. A monomer solution containing 66 parts of acrylamide, 12 parts of ethyl acrylate and 12 parts of acrylic acid in 120 parts of water was added dropwise to the above solution at such a speed that the total amount of the monomer solution was added in 4 hours, to effect reaction. Then, the mixture was aged for 4 hours to complete reaction. At this point, the concentration of the formed copolymer was 30% by weight. The obtained solution was diluted to form an aqueous solution where the concentration of the copolymer was 10% by weight. The solution was neutralized with concentrated aqueous ammonia so that the pH value was adjusted to 6.8. Then, 14 parts of glycerol diglycidyl ether was dissolved in the solution to form a surface-protecting layer-forming agent. The viscosity of this aqueous solution was 200 cp as measured at a temperature of 20° C., and the pot life was 30 hours.

(b) Preparation of Coating Liquid and Coating on Coated Paper (1) To 100 parts of the surface-protecting layer-forming agent was added 20 parts of calcium carbonate to form a coating liquid. The coating liquid was coated on a heat-sensitive recording paper comprising a leuco dye by using a wire bar and was then dried to form a surface-protecting layer having a thickness of 2 μm on the heat-sensitive recording paper.

(2) The surface-protecting layer-forming agent was spray-coated on a color photographic paper and dried to form a surface-protecting layer having a thickness of 1 μm on the color-photographic paper.

(c) Oil Resistance and Water Resistance Tests (1) The heat-sensitive recording paper obtained in (b)-1) above was aged at normal temperature for 7 days and was then printed by a thermal head. When the surface was coated with cottonseed oil or dioctyl phthalate and the density of the printed letter was measured after passage of 24 hours, it was found that the density was not changed at all. When the same heat-sensitive recording paper was immersed in water for 24 hours and the surface was rubbed with the fingers, the printed letters was not erased at all.

(2) The photographic paper obtained in (b)-2) above was aged at normal temperature for 7 days and was then used for copying. When the surface was coated with cottonseed oil or dioctyl phthalate and the color tone was examined after passage of 24 hours, no change of the color tone was observed. When the same photographic paper was immersed in water for 24 hours and the surface was rubbed with the fingers, no change was caused on the surface of the photographic paper.

For comparison, the leuco dye type heat-sensitive paper and the color-photographic paper were similarly tested without coating with the surface-protecting layer-forming agent of the present invention. Excellent oil resistance and water resistance as described above were not obtained.

EXAMPLES 14 THROUGH 18

With respect to each of various surface-protecting layer-formning agents described below, in the same manner as described in Example 13, a coating liquid was prepared and coated and dried on a leuco dye type heat-sensitive recording paper and a color-photographic paper, and the oil resistance and water resistance tests were carried out. It was found that each surface-protecting layer-forming agent had properties similar to those of the agent of Example 13.

(14) An aqueous solution formed by dissolving 2 parts of a diglycidyl ether of polyethylene glycol (having a molecular weight of 400) in 100 parts of a 10% by weight aqueous solution of a trimethylamine salt of a graft copolymer comprising 50 parts of polyvinyl alcohol having 1 mol % of the recurring vinyl alcohol units esterified with lauric acid, containing 2 mol % of copolymerized fumaric acid units and having a polymerization degree of 500, 35 parts of acrylamide, 5 parts of acrylonitrile and 10 parts of acrylic acid (the viscosity was 140 cp as measured at 20° C. and the pot life was 24 hours).

(15) An aqueous solution formed by incorporating 10 parts of a 30% by weight aqueous solution of a polyamide-polyamine/epichlorohydrin resin (Kaimen 667 supplied by Dick-Hercules Co.) into 100 parts of a 10% by weight aqueous solution of an ammonium salt of a graft copolymer comprising 50 parts of polyvinyl alcohol having 1.5 mol % of the recurring vinyl alcohol units esterified with Versatic acid, containing 2 mol % of copolymerized maleic acid units and having a polymerization degree of 1000, 25 parts of acrylamide, 10 parts of 2-hydroxypropyl methacrylate, 5 parts of methyl methacrylate and 10 parts of methacrylic acid (the viscosity was 200 cp as measured at 20° C. and the pot life was 18 hours).

(16) An aqueous solution formed by incorporating 25 parts of a 10% by weight aqueous solution of a copolymer comprising 80 parts of acrylamide and 20 parts of glycidyl methacrylate into 100 parts of a 10% aqueous solution of a sodium salt of a graft copolymer comprising 40 parts of polyvinyl alcohol having 2.5 mol % of the recurring vinyl alcohol units esterified with Versatic acid, containing 2.5 mol % of copolymerized fumaric acid units and having a polymerization degree of 1500, 40 parts of methacrylamide, 15 parts of hydroxyethyl methacrylate and 5 parts of acrylic acid (the viscosity was 250 cp as measured at 20° C. and the pot life was 48 hours).

(17) An aqueous solution formed by incorporating 7 parts of a 30% by weight aqueous solution of a polyamide-polyamine/epichlorohydrin resin (Kaimen 667 supplied by Dick Hercules Co.) into 100 parts of a 10% by weight aqueous solution of an ammonium salt of a graft copolymer comprising 25 parts of polyvinyl alcohol having 1.0 mol % of the recurring vinyl alcohol units esterified with tridecylic acid, containing 3 mol % of copolymerized acrylic acid units and having a polymerization degree of 1000, 55 parts of acrylamide, 5 parts of acrylonitrile, 10 parts of 2-hydroxypropyl methacrylate and 5 parts of itaconic acid (the viscosity was 180 cp as measured at 20° C. and the pot life was 25 hours).

(18) An aqueous solution formed by incorporating 10 parts of a 30% by weight aqueous solution of a polyamide-polyamine/epichlorohydron resin (Kaimen 667 supplied by Dick Hercules Co.) into 100 parts of a 10% by weight aqueous solution of an ammonium salt of a graft copolymer comprising 50 parts of polyvinyl alcohol having 2 mol % of the recurring vinyl alcohol units esterified with Versatic acid, containing 1.5 mol % of copolymerized maleic acid units and having a polymerization degree of 800, 35 parts of acrylamide, 5 parts of methyl methacrylate and 10 parts of acrylic acid (the viscosity was 170 cp as measured at 20° C. and the pot life was 20 hours).

We claim:

1. An agent for forming a surface-protecting layer on a coated paper, which comprises an aqueous solution of an alkali metal salt, ammonium salt or amine salt of a graft copolymer and an epoxy group-containing crosslinking agent incorporated in the aqueous solution, said graft copolymer comprising (A) 10 to 60% by weight of a polyvinyl alcohol polymer selected from the group consisting of partially saponified polyvinyl alcohols, polyvinyl alcohols containing copolymerized units of a vinyl monomer having carboxyl group, and polyvinyl alcohol having the recurring vinyl alcohol units esterified with a higher fatty acid, (B) 20 to 70% by weight of acrylamide or methacrylamide, (C) 5 to 30% by weight of at least one member selected from the group consisting of acrylonitrile, methacrylonitrile, lower alkyl esters of acrylic acid and methacrylic acid and hydroxyl lower alkyl esters of acrylic acid and methacrylic acid, and (D) 5 to 20% by weight of at least one vinyl monomer containing a carboxyl group.

2. An agent according to claim 1, wherein the partially saponified polyvinyl alcohol has a saponification degree of 75 to 96% and a polymerization degree of 500 to 2500.

3. An agent according to claim 2, wherein the partially saponified polyvinyl alcohol is partially modified with an acid.

4. An agent according to claim 1, wherein the polyvinyl alcohol containing copolymerized units of a vinyl monomer having carboxyl group is selected from those containing copolymerized units of acrylic, methacrylic, itaconic, fumaric and maleic acids.

5. An agent according to claim 4, wherein the polyvinyl alcohol contains 2 to 5 mol % of the vinyl monomer units having carboxyl group and have a saponification degree of 75 to 99% and a polymerization degree fo 500 to 2500.

6. An agent according to claim 1, wherein the polyvinyl alcohol having the recurring vinyl alcohol units esterified with a higher fatty acid is selected from those esterified with fatty acids having 8 to 18 carbon atoms.

7. An agent according to claim 6, wherein the polyvinyl alcohol has an esterification degree of 0.5 to 5%.

8. An agent according to claim 1, wherein the alkyl group in the alkyl or hydroxyalkyl ester of acrylic or methacrylic acid has 1 to 4 carbon atoms.

9. An agent according to claim 1, wherein the vinyl monomer (D) containing carboxyl group is selected from acrylic, methacrylic, itaconic, fumaric and maleic acids.

10. An agent according to claim 1, wherein the epoxy group-containing crosslinking agent is selected from nonionic water-soluble polyepoxy compounds such as polyethylene glycol diglycidyl ether, glycerol diglycidyl ether and trimethylolpropane polyglycidyl ether, and water-soluble epoxy compounds such as a water-soluble copolymer of a glycidyl ester of acrylic or methacrylic acid with acrylamide and an epichlorohydrin adduct of polyamide-polyamine.

11. A coated paper having the surface coated with the agent for forming a surface-protecting layer as claimed in any one of claims 1 through 10.

* * * * *